United States Patent
Sakumoto et al.

(10) Patent No.: US 9,300,466 B2
(45) Date of Patent: Mar. 29, 2016

(54) TRANSMITTING DEVICE, RECEIVING DEVICE, TRANSMITTING METHOD, RECEIVING METHOD, AND PROGRAM

(71) Applicant: Sony Corporation, Minato-ku (JP)

(72) Inventors: Koichi Sakumoto, Tokyo (JP); Seiichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 6 days.

(21) Appl. No.: 14/026,034

(22) Filed: Sep. 13, 2013

(65) Prior Publication Data

US 2014/0089668 A1    Mar. 27, 2014

(30) Foreign Application Priority Data

Sep. 25, 2012    (JP) .................................. 2012-211130

(51) Int. Cl.
    *H04L 9/08*    (2006.01)
    *H04L 9/32*    (2006.01)
    *H04L 9/30*    (2006.01)

(52) U.S. Cl.
    CPC .............. *H04L 9/0825* (2013.01); *H04L 9/308* (2013.01); *H04L 9/3247* (2013.01)

(58) Field of Classification Search
    None
    See application file for complete search history.

(56) References Cited

U.S. PATENT DOCUMENTS

| | | | | |
|---|---|---|---|---|
| 7,640,427 B2 * | 12/2009 | Callas et al. | ................... | 713/153 |
| 7,886,144 B2 * | 2/2011 | Brown et al. | ................... | 713/156 |
| 8,412,941 B2 * | 4/2013 | McKenna | ..................... | 713/168 |
| 2002/0004899 A1 * | 1/2002 | Azuma | ........................ | 713/152 |
| 2004/0054887 A1 * | 3/2004 | Paulsen et al. | ................. | 713/154 |
| 2006/0129629 A1 * | 6/2006 | Kawashima et al. | ......... | 709/203 |
| 2007/0067402 A1 * | 3/2007 | Sugii et al. | .................... | 709/206 |
| 2007/0127784 A1 * | 6/2007 | Taylor | .......................... | 382/115 |
| 2007/0130069 A1 * | 6/2007 | Kay et al. | ........................ | 705/50 |
| 2009/0327731 A1 * | 12/2009 | Appenzeller et al. | ......... | 713/171 |
| 2010/0161984 A1 * | 6/2010 | Pauker et al. | ................. | 713/168 |
| 2011/0179286 A1 * | 7/2011 | Spalka et al. | ................. | 713/189 |
| 2011/0202756 A1 * | 8/2011 | West | ............................ | 713/152 |

FOREIGN PATENT DOCUMENTS

JP    2005-141461    6/2005

* cited by examiner

*Primary Examiner* — Andrew Nalven
*Assistant Examiner* — Abdulhakim Nobahar
(74) *Attorney, Agent, or Firm* — Sony Corporation

(57) ABSTRACT

There is provided a transmitting device including a public key information adder that adds information on a public key corresponding to an electronic signature to a sender address in an email with the electronic signature attached, and a transmitter that transmits the email.

17 Claims, 11 Drawing Sheets

PUBLIC-KEY AUTHENTICATION SCHEM

ELECTRONIC SIGNATURE SCHEME

```
SENDER'S OWN MAIL ADDRESS (EX: sender@example.com)
MAIL ADDRESS WITH ADDED PUBLIC KEY pk (EX: sender+pk@example.com)
```

```
TO: receiver@example.com)          TO: receiver@example.com)
FROM: sender+pk@example.com   →    FROM: sender[+]@example.com
SUBJECT: TEST MAIL            ←    SUBJECT: TEST MAIL
``` pk IS HIDDEN BY DEFAULT; CLICKING [+] REVEALS pk

TRANSMITTING DEVICE, RECEIVING DEVICE, TRANSMITTING METHOD, RECEIVING METHOD, AND PROGRAM

BACKGROUND

The present disclosure relates to a transmitting device, a receiving device, a transmitting method, a receiving method, and a program.

In the related art, Japanese Unexamined Patent Application Publication No. 2005-141461, for example, describes technology envisioned to eliminate the necessity to teach the encryption scheme and shared key every time an encrypted mail message is transmitted or received, and provide an encrypted communication system able to resolve problems such as increases in communication traffic. With the technology described in Japanese Unexamined Patent Application Publication No. 2005-141461, a given encryption capability query email is transmitted from one communication client device F1, and when the query email is received at another communication client device F2, encryption capability information such as an encryption scheme and public key prepared in advance is transmitted as an email reply.

SUMMARY

However, the technology described in Japanese Unexamined Patent Application Publication No. 2005-141461 presupposes that the forwarding recipient associate and manage a public key and email when forwarding the public key by email. For this reason, the complicated processing of associating public keys and email becomes necessary.

Accordingly, there is demand to associate public keys and email without conducting complicated processing.

According to an embodiment of the present disclosure, there is provided a transmitting device including a public key information adder that adds information on a public key corresponding to an electronic signature to a sender address in an email with the electronic signature attached, and a transmitter that transmits the email.

Further, the transmitting device may further include a key generator that generates the public key and a secret key as a pair, a signature generator that generates the electronic signature, and an email creator that creates the email with the electronic signature attached.

Further, the transmitting device may further include a receiver that receives the email with the electronic signature attached from another device, and a public key information storage that stores the information on the public key corresponding to the electronic signature. The public key information adder may add the information on the public key extracted from the public key information storage to a sender address in the email received from the other device.

Further, the transmitting device may further include a verification result receiver that receives, from a receiving device that received the email, a result of verifying the electronic signature on the basis of the information on the public key.

Further, the electronic signature may be an electronic signature according to an MQ protocol.

Further, according to an embodiment of the present disclosure, there is provided a receiving device including a receiver that receives an email with an electronic signature attached, a public key information extractor that extracts information on a public key, corresponding to the electronic signature, that is added to a sender address in the email, and a verifier that verifies the electronic signature on the basis of the information on the public key.

Further, the receiving device may further include a transmitter that transmits a verification result by the verifier.

Further, the transmitter may cause a transmission recipient device to display the verification result in a manner that a display of text or a mark, or a display color, is modified according to the verification result.

Further, the email may be an email forwarded from a mailing list, and information identical to the information on the public key is included in a mail address of a poster who has posted to the mailing list.

Further, the electronic signature may be an electronic signature according to an MQ protocol.

Further, according to an embodiment of the present disclosure, there is provided a transmitting method including adding information on a public key corresponding to an electronic signature to a sender address in an email with the electronic signature attached, and transmitting the email.

Further, according to an embodiment of the present disclosure, there is provided a program causing a computer to function as a public key information adder that adds information on a public key corresponding to an electronic signature to a sender address in an email with the electronic signature attached, and a transmitter that transmits the email.

Further, according to an embodiment of the present disclosure, there is provided a receiving method including receiving an email with an electronic signature attached, extracting information on a public key, corresponding to the electronic signature, that is added to a sender address in the email, and verifying the electronic signature on the basis of the information on the public key.

Further, according to an embodiment of the present disclosure, there is provided a program causing a computer to function as a receiver that receives an email with an electronic signature attached, a public key information extractor that extracts information on a public key, corresponding to the electronic signature, that is added to a sender address in the email, and a verifier that verifies the electronic signature on the basis of the information on the public key.

According to embodiments of the present disclosure, associating public keys and email without conducting complicated processing becomes possible.

DETAILED DESCRIPTION OF THE EMBODIMENT(S)

Figure 1:
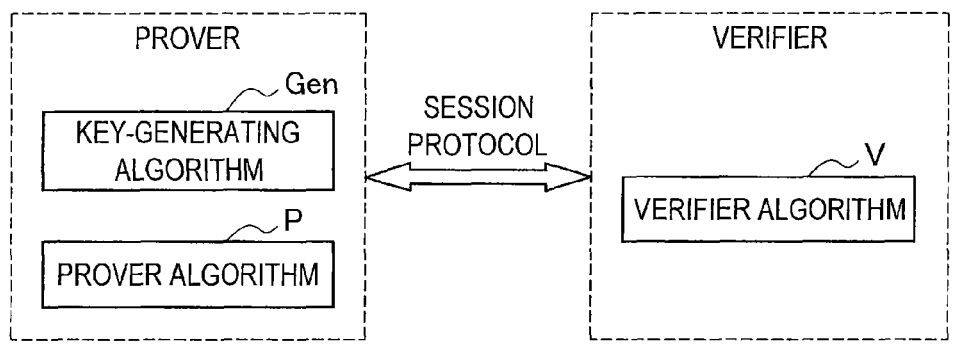
FIG. 1 is a schematic diagram summarizing algorithms for a public-key authentication scheme.

Hereinafter, preferred embodiments of the present technology will be described in detail with reference to the appended drawings. Note that, in this specification and the appended drawings, structural elements that have substantially the same function and structure are denoted with the same reference numerals, and repeated explanation of these structural elements is omitted.

[Flow of Description]

The flow of the description regarding the embodiments of the present technology described hereinafter will be now briefly discussed. First, an algorithm structure for a public-key authentication scheme will be described with reference to FIG. 1. Next, an algorithm structure for an electronic signature scheme will be described with reference to FIG. 2. Next, an n-pass public-key authentication scheme will be described with reference to FIG. 3.

Next, an example of algorithm structures related to a 3-pass public-key authentication scheme will be described with reference to FIGS. 4 and 6. Next, the first through fourth embodiments of the present disclosure will be described with reference to FIGS. 7 to 13. Next, an exemplary hardware configuration of an information processing apparatus capable of realizing the respective algorithms according to the embodiment of the present technology will be described with reference to FIG. 14.

TABLE OF CONTENTS

1. Introduction
1-1. Algorithm for public-key authentication scheme
1-2. Algorithm for electronic signature scheme
1-3. N-pass public-key authentication scheme
2. Algorithm structures related to 3-pass public-key authentication scheme
2-1. Example of specific algorithm structures
2-2. Example of parallelized algorithm structures
3. Modification to electronic signature scheme
3-1. Modification from 3-pass public-key authentication scheme to electronic signature scheme
4. Specific embodiments
4-1. Summary of system according to an embodiment of present disclosure
4-2. Example of mail address display format
4-3. Process by system according to present embodiment
4-4. Sender confirmation based on public key
4-5. Adding public key by transmitting server
4-6. Exemplary configuration of system according to present embodiment
4-7. Application to mail forwarding and mailing lists 4-8. Methods of specifying public key part
5. Exemplary hardware configuration

1. Introduction

The embodiments herein relate to a public-key authentication scheme and an electronic signature scheme that base their safety on the difficulty of solving high-order, multivariate systems of equations (hereinafter also referred to as the MQ protocol in some cases). However, the embodiments herein differ from techniques of the related art such as HFE electronic signature schemes, and relate to a public-key authentication scheme and an electronic signature scheme that utilize high-order, multivariate systems of equations that lack a mechanism of efficient solving (trapdoors). Note that authentication schemes applicable to the embodiments herein are not limited to the above, and that it is possible to broadly apply other public-key authentication schemes. First, algorithms for a public-key authentication scheme, algorithms for an electronic signature scheme, and an n-pass public-key authentication scheme will be briefly summarized.

[1-1. Algorithms for Public-Key Authentication Scheme]

First, algorithms for a public-key authentication scheme will be summarized with reference to FIG. 1. FIG. 1 is an explanatory diagram algorithms for public-key authentication scheme.

Public-key authentication is used in order for a certain person (the prover, also referred to as Alice) to convince another person (the verifier, also referred to as Bob) that she is herself by using a public key pk and a secret key sk. For example, Alice's public key $pk_A$ is disclosed to Bob. On the other hand, Alice keeps her secret key $sk_A$ a secret. In the public-key authentication setup, it is assumed that Alice herself is the person who knows the secret key $sk_A$ corresponding to the public key $pk_A$.

In order for Alice to prove to Bob that she is Alice herself using the public-key authentication setup, Alice, via a session protocol, presents proof to Bob indicating that she knows the secret key $sk_A$ corresponding to the public key $pk_A$. The proof indicating the Alice knows the secret key $sk_A$ is then presented to Bob, and in the case where Bob is able to confirm that proof, the validity of Alice (the fact that Alice is herself) is proven.

However, a public-key authentication setup demands the following conditions in order to ensure safety.

The first condition is that a forger who does not possess the secret key sk when executing the session protocol has a vanishingly small probability of creating a forgery. Upholding the first condition is called "soundness". In other words, soundness may be restated as: "a forger lacking a secret key sk has a negligible chance of establishing a forgery during the session protocol." The second condition is that no information about Alice's secret key $sk_A$ is divulged to Bob, even if executing the session protocol. Upholding the second condition is called "zero-knowledge".

Conducting public-key authentication safely involves using a session protocol exhibiting both soundness and zero-knowledge. If an authentication process were hypothetically conducted using a session protocol lacking soundness and zero-knowledge, there would be a definite chance of false verification and a definite chance of the divulgence of secret key information, and thus the validity of the prover would not be proven even if the process itself is completed successfully. Consequently, the question of how to ensure the soundness and zero-knowledge of a session protocol is important.

(Model)

As illustrated in FIG. 1, the two identities of prover and verifier exist in a model of a public-key authentication scheme. The prover uses a key-generating algorithm Gen to generate a paired secret key sk and public key pk unique to the prover. Subsequently, the prover uses the paired secret key sk and public key pk generated using the key-generating algorithm Gen to execute a session protocol with a verifier. At this point, the prover executes the session protocol by using a prover algorithm P. As above, the prover uses the prover algorithm P to present proof that she possesses the secret key sk to the verifier during the session protocol.

Meanwhile, the verifier executes the session protocol using a verifier algorithm V, and verifies whether or not the prover possesses the secret key corresponding to the public key made public by that prover. In other words, the verifier is an entity that verifies whether or not the prover possesses the secret key that corresponds to the public key. In this way, the model of a public-key authentication scheme is made up of the two entities of the verifier and the verifier, and the three algorithms of the key-generating algorithm Gen, the prover algorithm P, and the verifier algorithm V.

Figure 14:
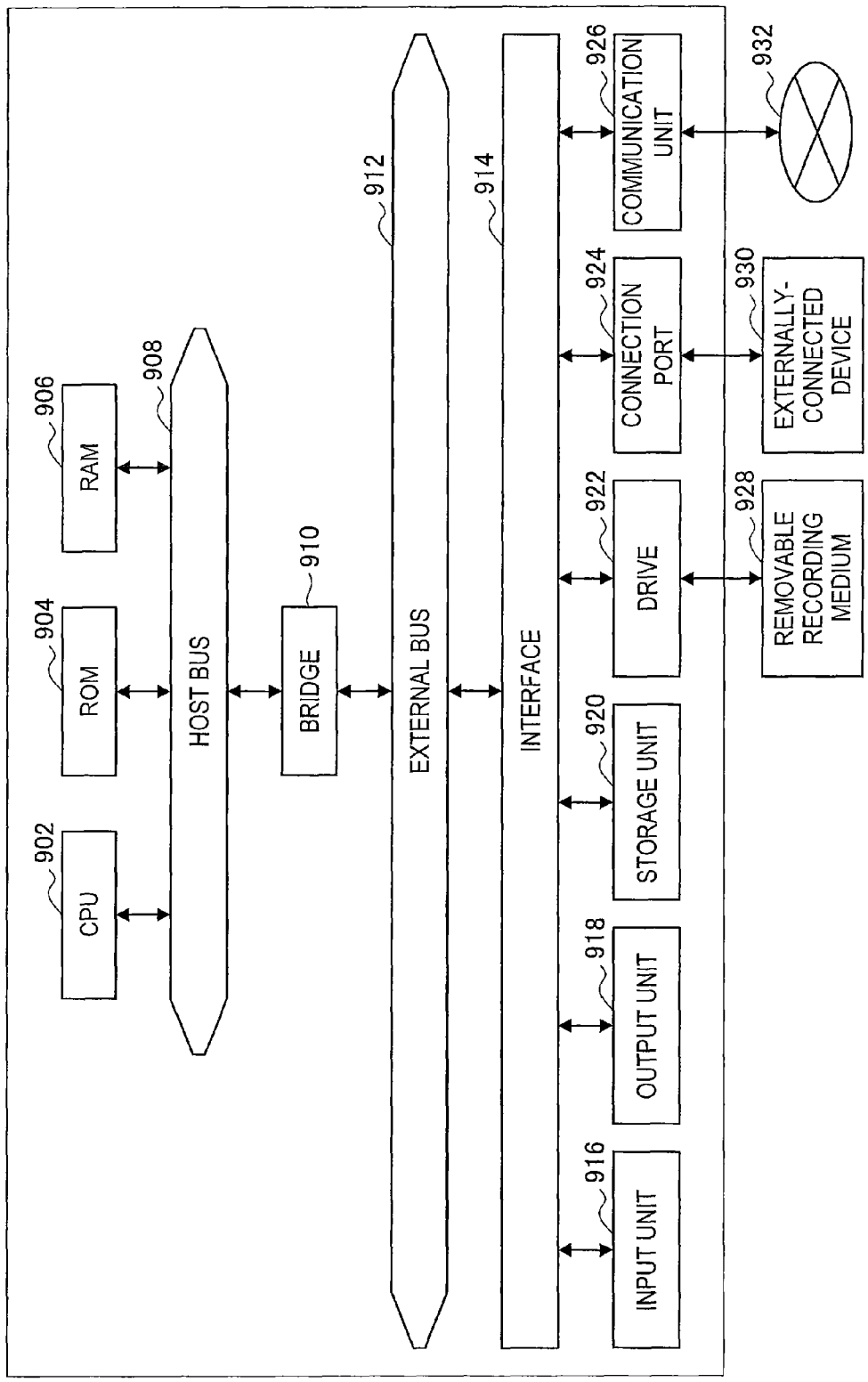
FIG. 14 is a schematic diagram illustrating a hardware configuration of an information processing apparatus.

Note that although the terms "prover" and "verifier" are used in the description hereinafter, these terms ultimately mean entities. Consequently, the agent that executes the key-generating algorithm Gen and the prover algorithm P is an information processing apparatus corresponding to the "prover" entity. Similarly, the agent that executes the verifier algorithm V is an information processing apparatus. The hardware configuration of these information processing apparatus is as illustrated in FIG. 14, for example. In other words, the key-generating algorithm Gen, the prover algorithm P, and the verifier algorithm V are executed by a device such as a CPU 902 on the basis of a program recorded onto a device such as ROM 904, RAM 906, a storage unit 920, or a removable medium 928.

(Key-Generating Algorithm Gen)

The key-generating algorithm Gen is used by the prover. The key-generating algorithm Gen is an algorithm that generates a paired secret key sk and public key pk unique to the prover. The public key pk generated by the key-generating algorithm Gen is made public. The public key pk thus made public is then used by the verifier. Meanwhile, the prover keeps the secret key sk generated by the key-generating algorithm Gen a secret. The secret key sk kept secret by the prover is then used to prove to the verifier that the prover possesses the secret key sk corresponding to the public key pk. Formally, the key-generating algorithm Gen is expressed as an algorithm like the following Eq. 1, which accepts a security parameter $1^\lambda$ (where $\lambda$ is an integer equal to or greater than 0) as input, and outputs a secret key sk and a public key pk.

$$(sk, pk) \leftarrow \text{Gen}(1^\lambda) \tag{1}$$

(Prover Algorithm P)

The prover algorithm P is used by the prover. The prover algorithm P is an algorithm for proving to the verifier that the prover possesses the secret key sk corresponding to the public key pk. In other words, the prover algorithm P is an algorithm that accepts a secret key sk and a public key pk as input, and executes a session protocol.

(Verifier Algorithm V)

The verifier algorithm V is used by the verifier. The verifier algorithm V is an algorithm that verifies whether or not the prover possesses the secret key sk corresponding to the public key pk during the session protocol. The verifier algorithm V is an algorithm that accepts a public key pk as input, and outputs 0 or 1 (1 bit) according to the execution results of the session protocol. At this point, the verifier decides that the prover is invalid in the case where the verifier algorithm V outputs 0, and decides that the prover is valid in the case where the verifier algorithm V outputs 1. Formally, the verifier algorithm V is expressed as in the following Eq. 2.

$$0/1 \leftarrow V(pk) \tag{2}$$

As above, realizing meaningful public-key authentication involves having the session protocol satisfy the two conditions of soundness and zero-knowledge. However, proving that the prover possesses the secret key sk involves the prover executing a procedure dependent on the secret key sk, and after notifying the verifier of the result, causing the verifier to execute verification based on the content of the notification. The procedure dependent on the secret key sk is executed to ensure soundness. At the same time, no information about the secret key sk should be revealed to the verifier. For this reason, the above key-generating algorithm Gen, prover algorithm P, and verifier algorithm V are skillfully designed to satisfy these requirements.

The foregoing thus summarizes the algorithms in a public-key authentication scheme.

[1-2. Algorithms for Electronic Signature Scheme]

Figure 2:
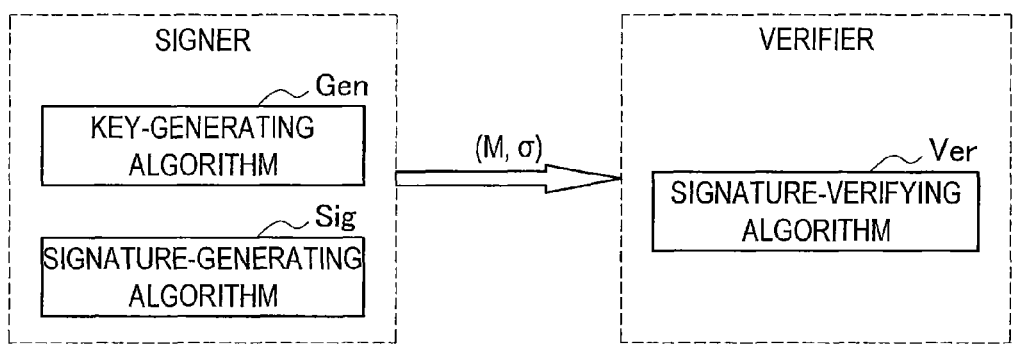
FIG. 2 is a schematic diagram summarizing algorithms for an electronic signature scheme.

Next, algorithms for an electronic signature scheme will be summarized with reference to FIG. 2. FIG. 2 is an explanatory diagram summarizing algorithms for an electronic signature scheme.

Unlike paper documents, it is not possible to physically sign or affix a seal to digitized data. For this reason, proving the creator of digitized data involves an electronic setup yielding effects similarly to physically signing or affixing a seal to a paper document. This setup is electronic signatures. An electronic signature refers to a setup that associates given data with signature data known only to the creator of the data, provides the signature data to a recipient, and verifies that signature data on the recipient's end.

(Model)

As illustrated in FIG. 2, the two identities of signer and verifier exist in a model of an electronic signature scheme. In addition, the model of an electronic signature scheme is made up of three algorithms: a key-generating algorithm Gen, a signature-generating algorithm Sig, and a signature-verifying algorithm Ver.

The signer uses the key-generating algorithm Gen to generate a paired signature key sk and verification key pk unique to the signer. The signer also uses the signature-generating algorithm Sig to generate an electronic signature a to attach to a message M. In other words, the signer is an entity that attaches an electronic signature to a message M. Meanwhile, the verifier uses the signature-verifying algorithm Ver to verify the electronic signature a attached to the message M. In other words, the verifier is an entity that verifies the electronic signature a in order to confirm whether or not the creator of the message M is the signer.

Note that although the terms "signer" and "verifier" are used in the description hereinafter, these terms ultimately mean entities. Consequently, the agent that executes the key-generating algorithm Gen and the signature-generating algorithm Sig is an information processing apparatus corresponding to the "signer" entity. Similarly, the agent that executes the signature-verifying algorithm Ver is an information processing apparatus. The hardware configuration of these information processing apparatus is as illustrated in FIG. 14, for example. In other words, the key-generating algorithm Gen, the signature-generating algorithm Sig, and the signature-verifying algorithm Ver are executed by a device such as a CPU 902 on the basis of a program recorded onto a device such as ROM 904, RAM 906, a storage unit 920, or a removable medium 928.

(Key-Generating Algorithm Gen)

The key-generating algorithm Gen is used by the signer. The key-generating algorithm Gen is an algorithm that generates a paired signature key sk and verification key pk unique to the signer. The verification key pk generated by the key-generating algorithm Gen is made public. Meanwhile, the signer keeps the signature key sk generated by the key-generating algorithm Gen a secret. The signature key sk is then used to generate electronic signature σ to attach to a message M. For example, the key-generating algorithm Gen accepts a security parameter $1^\lambda$ (where λ is an integer equal to or greater than 0) as input, and outputs a signature key sk and a verification key pk. In this case, the key-generating algorithm Gen may be expressed formally as in the following Eq. 3.

$$(sk, pk) \leftarrow \text{Gen}(1^\lambda) \quad (3)$$

(Signature-Generating Algorithm Sig)

The signature-generating algorithm Sig is used by the signer. The signature-generating algorithm Sig is an algorithm that generates an electronic signature σ to be attached to a message M. The signature-generating algorithm Sig is an algorithm that accepts a signature key sk and a message M as input, and outputs an electronic signature σ. The signature-generating algorithm Sig may be expressed formally as in the following Eq. 4.

$$\sigma \leftarrow \text{Sig}(sk, M) \quad (4)$$

(Signature-Verifying Algorithm Ver)

The signature-verifying algorithm Ver is used by the verifier. The signature-verifying algorithm Ver is an algorithm that verifies whether or not the electronic signature σ is a valid electronic signature for the message M. The signature-verifying algorithm Ver is an algorithm that accepts a signer's verification key pk, a message M, and an electronic signature σ as input, and outputs 0 or 1 (1 bit). The signature-verifying algorithm Ver may be expressed formally as in the following Eq. 5. At this point, the verifier decides that the electronic signature σ is invalid in the case where the signature-verifying algorithm Ver outputs 0 (the case where the verification key pk rejects the message M and the electronic signature σ), and decides that the electronic signature σ is valid in the case where the signature-verifying algorithm Ver outputs 1 (the case where the verification key pk accepts the message M and the electronic signature σ).

$$0/1 \leftarrow \text{Ver}(pk, M, \sigma) \quad (5)$$

The foregoing thus summarizes the algorithms in an electronic signature scheme.

[1-3. N-Pass Public-Key Authentication Scheme]

Figure 3:
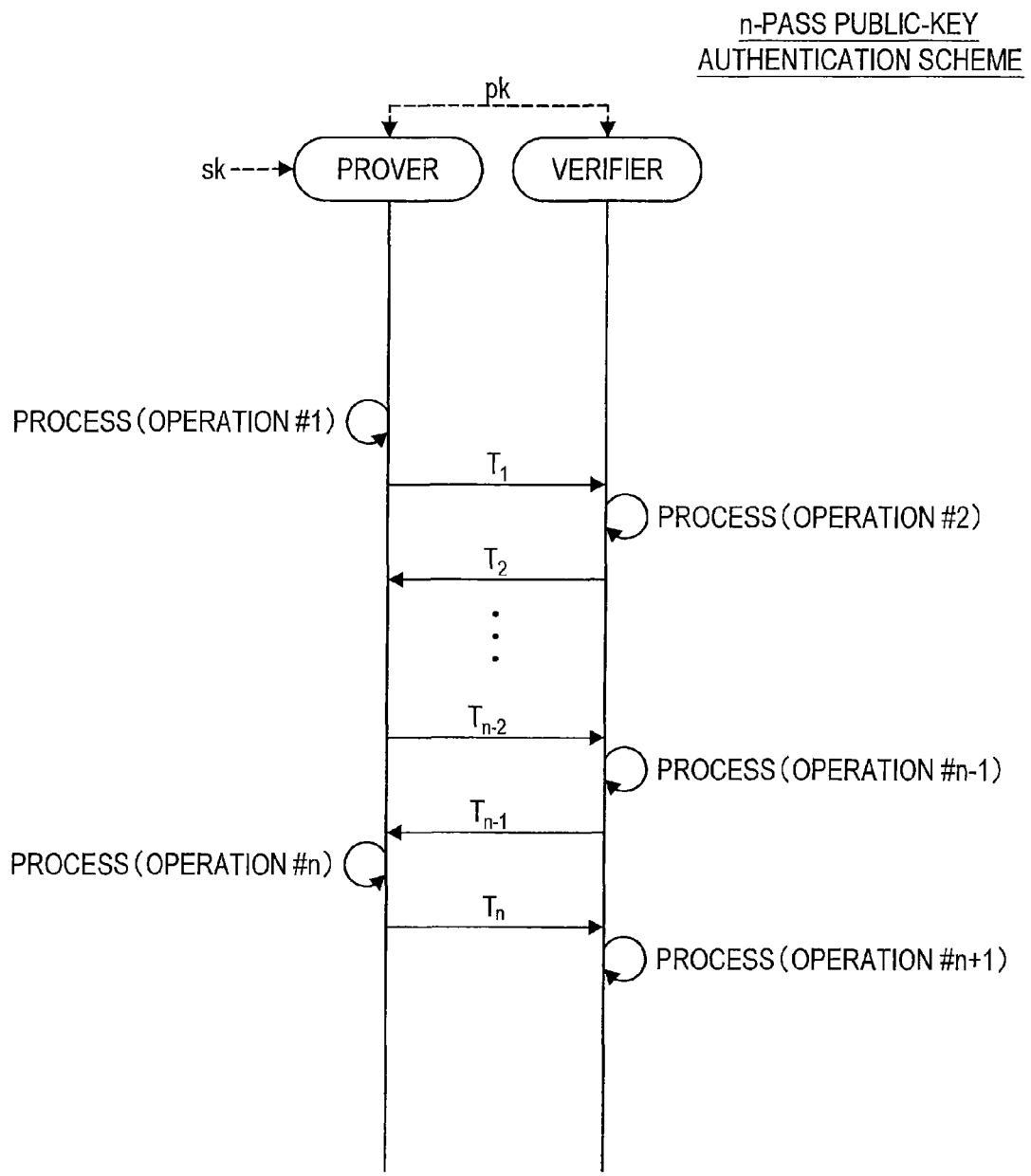
FIG. 3 is an explanatory diagram illustrating an n-pass public-key authentication scheme.

Next, an n-pass public-key authentication scheme will be described with reference to FIG. 3. FIG. 3 is an explanatory diagram illustrating an n-pass public-key authentication scheme.

As above, a public-key authentication scheme is an authentication scheme that proves to a verifier that a prover possesses a secret key sk corresponding to a public key pk during a session protocol. In addition, the session protocol has to satisfy the two conditions of soundness and zero-knowledge. For this reason, during the session protocol both the prover and the verifier exchange information n times while executing respective processes, as illustrated in FIG. 3.

In the case of an n-pass public-key authentication scheme, the prover executes a process using the prover algorithm P (operation #1), and transmits information $T_1$ to the verifier. Subsequently, the verifier executes a process using the verifier algorithm V (operation #2), and transmits information $T_2$ to the prover. This execution and processes and transmission of information $T_k$ is successively conducted for k=3 to n, and lastly, a process (operation #n+1) is executed. Transmitting and receiving information n times in this way is thus called an "n-pass" public-key authentication scheme.

The foregoing thus describes an n-pass public-key authentication scheme.

2. Algorithm Structures Related to 3-Pass Public-Key Authentication Scheme

Hereinafter, algorithms related to a 3-pass public-key authentication scheme will be described. Note that in the following description, a 3-pass public-key authentication scheme may also be referred to as a "3-pass scheme" in some cases.

[2-1. Example of Specific Algorithm Structures (FIG. 4)]

Figure 4:
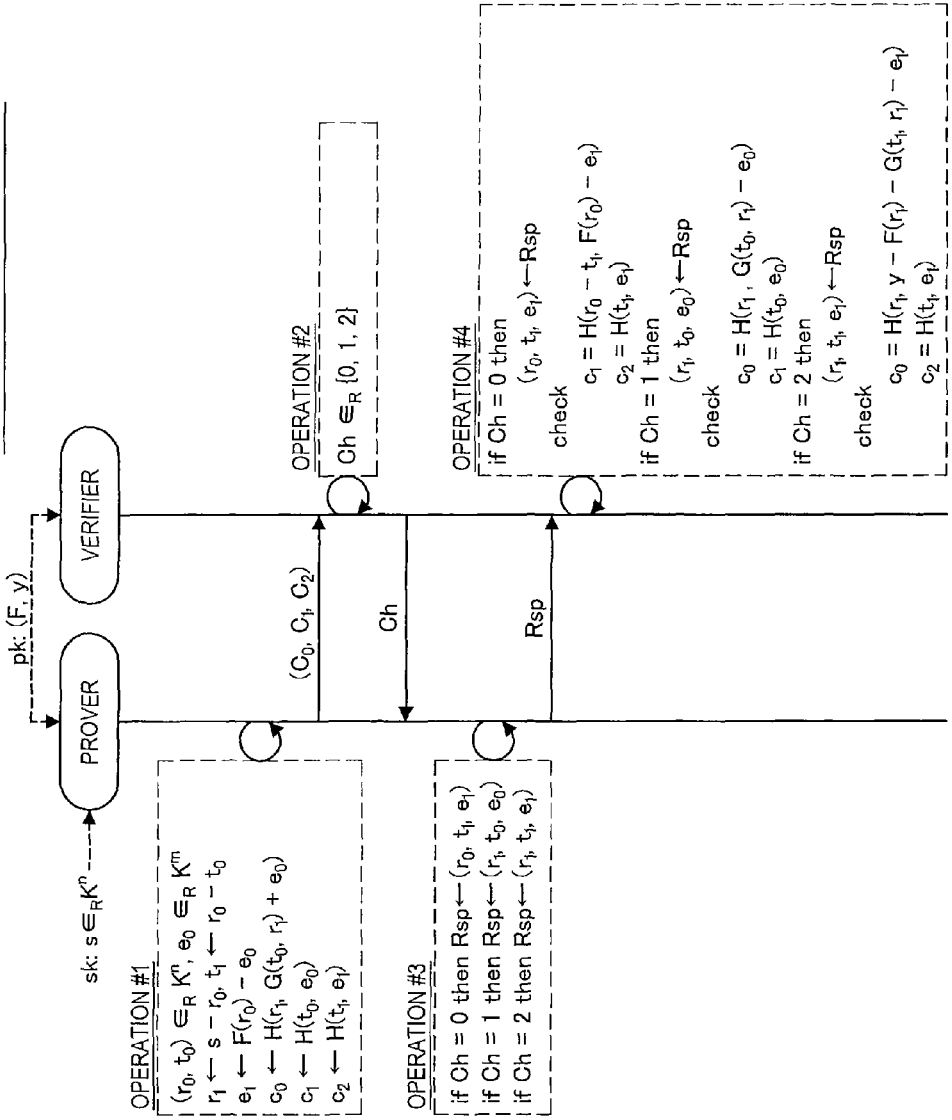
FIG. 4 is a diagram illustrating specific algorithm structures related to a 3-pass scheme.

First, an example of specific algorithm structures related to a 3-pass scheme will be introduced with reference to FIG. 4. FIG. 4 is a diagram illustrating specific algorithm structures related to a 3-pass scheme. At this point, consider the case of using a system of second-order polynomials $(f_1(x), \ldots, f_m(x))$ as part of a public key pk. However, assume that a second-order polynomial $f_i(x)$ is expressed as in the following Eq. 6. In addition, x will denote the vectors $(x_1, \ldots, x_n)$, and the multivariate polynomial F(x) will denote the system of second-order polynomials $(f_1(x), \ldots, f_m(x))$.

$$f_i(x_1, \ldots, x_n) = \sum_{j,k} a_{ijk} x_j x_k + \sum_j b_{ij} x_j \quad (6)$$

The system of second-order polynomials $(f_1(x), \ldots, f_m(x))$ may also be expressed as in the following Eq. 7, where $A_1$ to $A_m$ are n×n matrices, and $b_1$ to $b_m$ are respective n×1 vectors.

$$F(x) = \begin{pmatrix} f_1(x) \\ \vdots \\ f_m(x) \end{pmatrix} = \begin{pmatrix} x^T A_1 x + b_1^T x \\ \vdots \\ x^T A_m x + b_m^T x \end{pmatrix} \quad (7)$$

Using this expression, the multivariate polynomial F may be expressed as in the following Eq. 8 and 9. These expressions may be easily confirmed from Eq. 10 below.

$$F(x+y) = F(x) + F(y) + G(x, y) \quad (8)$$

$$G(x, y) = \begin{pmatrix} y^T(A_1^T + A_1)x \\ \vdots \\ y^T(A_m^T + A_m)x \end{pmatrix} \quad (9)$$

$$\begin{aligned} f_i(x+y) &= (x+y)^T A_i(x+y) + b_i^T(x+y) \\ &= x^T A_i x + x^T A_i y + y^T A_i x + y^T A_i y + b_i^T x + b_i^T y \\ &= f_i(x) + f_i(y) + x^T A_i y + y^T A_i x \\ &= f_i(x) + f_i(y) + x^T (A_i^T)^T y + y^T A_i x \\ &= f_i(x) + f_i(y) + (A_i^T x)^T y + y^T A_i x \\ &= f_i(x) + f_i(y) + y^T (A_i^T x) + y^T A_i x \\ &= f_i(x) + f_i(y) + y^T (A_i^T + A_i)x \end{aligned} \quad (10)$$

When dividing F(x+y) into a first portion dependent on x, a second portion dependent on y, and a third portion dependent on both x and y in this way, the term G(x, y) corresponding to the third portion becomes bilinear with respect to x and y. Hereinafter, the term G(x, y) may be referred to as the bilinear term in some cases. Using this property enables the construction of an efficient algorithm.

For example, use the vector $t_0$ that is an element of the set $K^n$ and the vector $e_0$ that is an element of the set $K^m$ to express the multivariate polynomial $F^1(x)$, which is used to mask the multivariate polynomial $F(x+r)$, as $F_1(x)=G(x, t_0)+e_0$. In this case, the sum of the multivariate polynomial $F(x+r_0)$ and $G(x)$ is expressed as in Eq. 11 below. Provided that $t_1=r_0+t_0$ and $e_1=F(r_0)+e_0$, the multivariate polynomial $F_2(x)=F(x+r_0)+F_1(x)$ can be expressed by the vector $t_1$ that is an element of the set $K^n$ and the vector $e_1$ that is an element of the set $K^m$. For this reason, setting $F_1(x)=G(x, t_0)+e_0$ enables the expression of $F_1$ and $F_2$ using a vector in $K^n$ and a vector in $K^m$, making it possible to realize an efficient algorithm with a small data size for communication.

$$F(x+r_0) + F_1(x) = F(x) + F(r_0) + G(x, r_0) + G(x, t_0) + e_0 \quad (11)$$
$$= F(x) + G(x, r_0 + t_0) + F(r_0) + e_0$$

Note that no information regarding $r_0$ is divulged from $F_2$ (or $F_1$). For example, even if $e_1$ and $t_1$ (or $e_0$ and $t_0$) are given, no information about $r_0$ is ascertained as long as $e_0$ and $t_0$ (or $e_1$ and $t_1$) are unknown. Consequently, zero-knowledge is ensured. Hereinafter, algorithms for a 3-pass scheme constructed on the basis of the above logic will be described. The algorithms for the 3-pass scheme described herein are made up of a key-generating algorithm Gen, a prover algorithm P, and a verifier algorithm V like the following.

(Key-Generating Algorithm Gen)

The key-generating algorithm Gen generates m multivariate polynomials $f_1(x_1, \ldots, x_n), \ldots, f_m(x_1, \ldots, x_n)$ defined on a ring K, and a vector $s=(s_1, \ldots, s_n)$ that is an element of the set $K^n$. Next, the key-generating algorithm Gen calculates $y=(y_1, \ldots, y_m)\leftarrow(f_1(s), \ldots, f_m(s))$. The key-generating algorithm Gen also sets $f_1(x_1, \ldots, x_n), \ldots, f_m(x_1, \ldots, x_n)$ as the public key, and set s as the secret key.

(Prover Algorithm P, Verifier Algorithm V)

Hereinafter, a process executed by the prover algorithm P and a process executed by the verifier algorithm V during the session protocol will be described with reference to FIG. 4. During the session protocol, the prover indicates to the verifier that "I know an s satisfying y=F(s)", without divulging information about the secret key s to the verifier. Meanwhile, the verifier verifies whether or not the prover knows an s satisfying y=F(s). Note that the public key pk is assumed to be made public to the verifier. Also, the secret key s is assumed to be kept a secret by the prover. Hereinafter, the description will proceed following the flowchart illustrated in FIG. 4.

Operation #1:

As illustrated in FIG. 4, the prover algorithm P first randomly generates the vector $r_0$, $t_0$ that is an element of the set $K^n$, and the vector $e_0$ that is an element of the set $K^m$. Subsequently, the prover algorithm P calculates $r_1 \leftarrow s-r_0$. This calculation is equivalent to masking the secret key s with the vector $r_0$. Additionally, the prover algorithm P calculates $t_0 \leftarrow r_0-t_0$. Subsequently, the prover algorithm P calculates $e_1 \leftarrow F(r_0)-e_0$.

Operation #1 (Continued):

Subsequently, the prover algorithm P calculates $c_0 \leftarrow H(r_1, G(t_0, r_1)+e_0)$. Subsequently, the prover algorithm P calculates $c_1 \leftarrow H(t_0, e_0)$. Subsequently, the prover algorithm P calculates $c_2 \leftarrow H(t_1, e_1)$. The message $(c_0, c_1, c_2)$ generated in operation #1 is sent to the verifier algorithm V.

Operation #2:

Upon receiving the message $(c_0, c_1, c_2)$, the verifier algorithm V selects which verification pattern to use from among three verification patterns. For example, the verifier algorithm V may select a numerical value from among three numerical values {0, 1, 2} representing verification patterns, and set the selected numerical value in a challenge Ch. This challenge Ch is sent to the prover algorithm P.

Operation #3:

Upon receiving the challenge Ch, the prover algorithm P generates a response Rsp to send to the verifier algorithm V in response to the received challenge Ch. In the case where Ch=0, the prover algorithm P generates a response Rsp=$(r_0, t_1, e_1)$. In the case where Ch=1, the prover algorithm P generates a response Rsp=$(r_1, t_0, e_0)$. In the case where Ch=2, the prover algorithm P generates a response Rsp=$(r_1, t_1, e_1)$. The response Rsp generated in operation #3 is sent to the verifier algorithm V.

Operation #4:

Upon receiving the response Rsp, the verifier algorithm V executes the following verification process using the received response Rsp.

In the case where Ch=0, the verifier algorithm V verifies whether or not the equality of $c_1=H(r_0-t_1, F(r_0)-e_1)$ holds. In addition, the verifier algorithm V verifies whether or not the equality of $c_2=H(t_1, e_1)$ holds. The verifier algorithm V outputs the value 1 to indicate authentication success in the case where these verifications all succeed, and outputs the value 0 to indicate authentication failure in the case where a verification fails.

In the case where Ch=1, the verifier algorithm V verifies whether or not the equality of $c_0=H(r_1, G(t_0, r_1)+e_0)$ holds. In addition, the verifier algorithm V verifies whether or not the equality of $c_1=H(t_0, e_0)$ holds. The verifier algorithm V outputs the value 1 to indicate authentication success in the case where these verifications all succeed, and outputs the value 0 to indicate authentication failure in the case where a verification fails.

In the case where Ch=2, the verifier algorithm V verifies whether or not the equality of $c_0=H(r_1, y-F(r_1)-G(t_1, r_1)-e_1)$ holds. In addition, the verifier algorithm V verifies whether or not the equality of $c_2=H(t_1, e_1)$ holds. The verifier algorithm V outputs the value 1 to indicate authentication success in the case where these verifications all succeed, and outputs the value 0 to indicate authentication failure in the case where a verification fails.

The foregoing thus describes an example of efficient algorithm structures related to a 3-pass scheme.

[2-2. Example of Parallelized Algorithm Structures (FIG. 5)]

Next, a method of parallelizing the algorithms of the 3-pass scheme illustrated in FIG. 4 will be described with reference to FIG. 5. However, further description of the structure of the key-generating algorithm Gen will be omitted.

Applying the above session protocol makes it possible to keep the probability of a successful forgery to 2/3 or less. Consequently, executing the session protocol twice makes it possible to keep the probability of a successful forgery to $(2/3)^2$ or less. Furthermore, if the session protocol is executed N times, the probability of a successful forgery becomes $(2/3)^N$, and if N is set to a sufficiently large number (N=140, for example), the probability of a successful forgery becomes negligibly small.

Conceivable methods of executing a session protocol multiple times include a serial method that sequentially repeats the exchange of message, challenge, and response multiple times, and a parallel method that exchanges multiple messages, challenges, and responses in a single exchange, for example. In addition, hybrid methods combining a serial method and a parallel method are also conceivable. Algorithms that execute the above session protocol related to a 3-pass scheme in parallel (hereinafter designated parallelized algorithms) will now be described with reference to FIG. 5.

Figure 5:
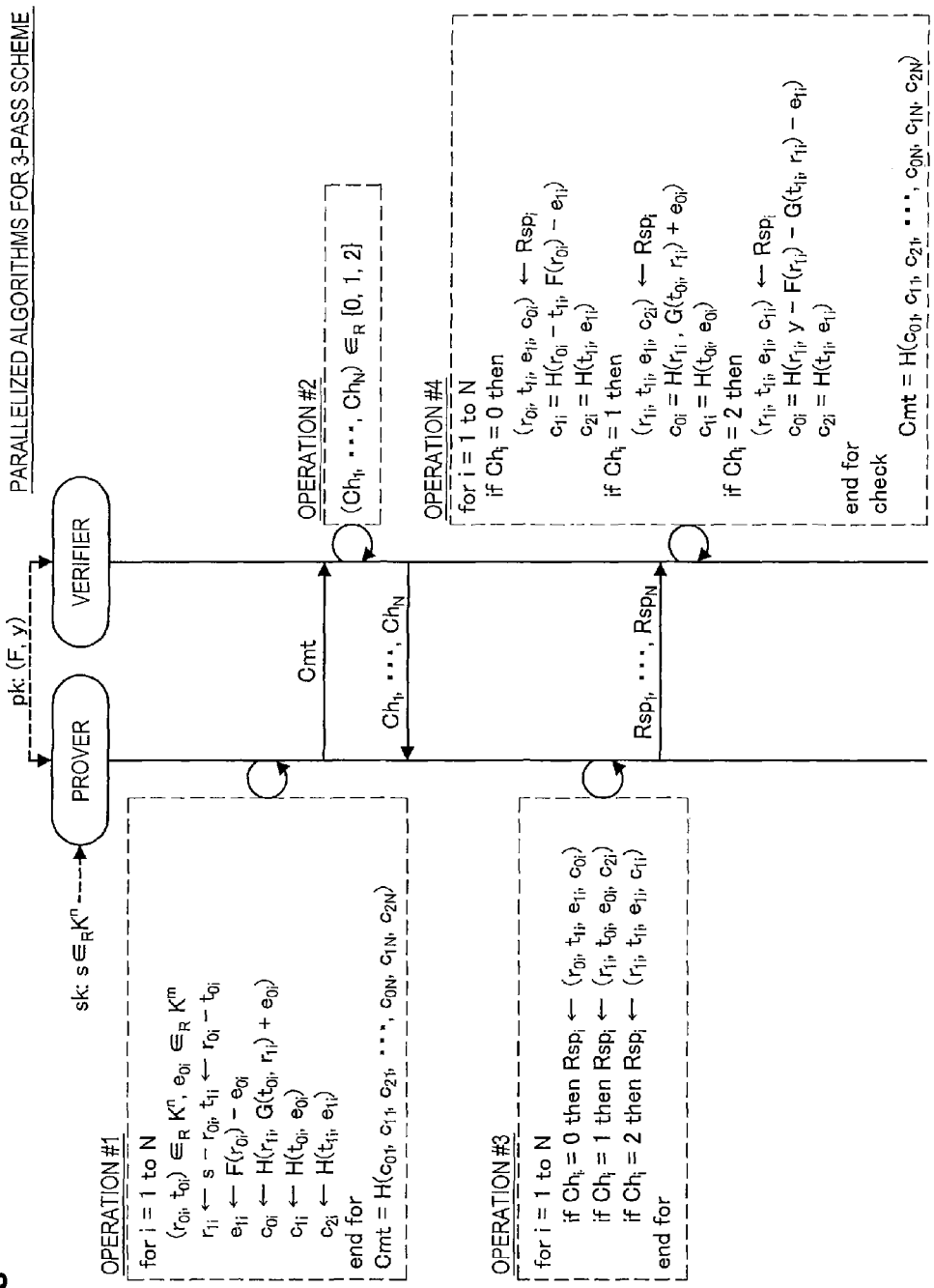
FIG. 5 is a schematic diagram illustrating a method of parallelizing the algorithms for the 3-pass scheme illustrated in FIG. 4.

Operation #1:

As illustrated in FIG. 5, the prover algorithm P first executes the following processes (1) to (6) for i=1 to N.

Process (1): The prover algorithm P randomly generates the vectors $r_{0i}$, $t_{0i}$ that are elements of the set and the vector $e_{0i}$ that is an element of the set $K^m$.

Process (2): The prover algorithm P calculates $r_{1i} \leftarrow s-r_{0i}$. This calculation is equivalent to masking the secret key s with the vector $r_{0i}$. Additionally, the prover algorithm P calculates $t_{1i} \leftarrow r_{0i}-t_{0i}$.

Process (3): The prover algorithm P calculates $e_{1i} \leftarrow F(r_{0i})-e_{0i}$.

Process (4): The prover algorithm P calculates $c_{0i} \leftarrow H(r_{1i}, G(t_{0i}, t_{1i})+e_{0i})$.

Process (5): The prover algorithm P calculates $c_{1i} \leftarrow H(t_{0i}, e_{0i})$.

Process (6): The prover algorithm P calculates $c_{2i} \leftarrow H(t_{1i}, e_{1i})$.

Operation #1 (continued):

After executing the above processes (1) to (6) for i=1 to N, the prover algorithm P calculates $Cmt \leftarrow H(c_{01}, c_{11}, c_{21}, \ldots c_{0N}, c_{1N}, c_{2N})$. The hash value Cmt generated in operation #1 is sent to the verifier algorithm V. In this way, the message $(c_{01}, c_{11}, c_{21}, \ldots c_{0N}, c_{1N}, c_{2N})$ is converted into a hash value before being sent to the verifier algorithm V, thus enabling a reduction in the communication volume. Note that the prover algorithm P may also send $(c_{0i}, c_{11}, c_{21}, \ldots, c_{0N}, c_{1N}, c_{2N})$ to the verifier algorithm V.

Operation #2:

Upon receiving the hash value Cmt, the verifier algorithm V selects which verification pattern to use from among three verification patterns, for each of i=1 to N. For example, the verifier algorithm V may, for each of i=1 to N, select a numerical value from among three numerical values {0, 1, 2} representing verification patterns, and set the selected numerical value in a challenge $Ch_i$. The challenges $Ch_1, \ldots, Ch_N$ are sent to the prover algorithm P.

Operation #3:

Upon receiving the challenges $Ch_1, \ldots, Ch_N$, the prover algorithm P generates responses $Rsp_1, \ldots, Rsp_N$ to send to the verifier algorithm V in response to each of the received challenges $Ch_1, \ldots, Ch_N$. In the case where $Ch_i=0$, the prover algorithm P generates a response $Rsp_i=(r_{0i}, t_{1i}, e_{1i}, c_0)$. In the case where $Ch_i=1$, the prover algorithm P generates a response $Rsp_i=(r_{1i}, t_{1e}, e_{1i}, c_{1i})$. In the case where Ch=2, the prover algorithm P generates a response $Rsp_i=(r_{1i}, t_{1i}, e_{1i}, c_{1i})$.

The responses $Rsp_1, \ldots, Rsp_N$ generated in operation #3 are sent to the verifier algorithm V.

Operation #4:

Upon receiving the responses $Rsp_1, \ldots, Rsp_N$, the verifier algorithm V executes the following processes (1) to (3) for i=1 to N, using the received responses $Rsp_1, \ldots, Rsp_N$. Herein, the verifier algorithm V executes the process (1) for the case where $Ch_i=0$, the process (2) in the case where $Ch_i=1$, and the process (3) in the case where $Ch_i=2$.

Process (1): In the case where $Ch_i=0$, the verifier algorithm V retrieves $(r_{0i}-t_{1i}, e_{1i}, c_{0i})$ from $Rsp_i$. Subsequently, the verifier algorithm V calculates $c_{1i}=H(r_{0i}-t_{1i}, F(r_{0i})-e_{1i})$. In addition, the verifier algorithm V calculates $c_{2i}=H(t_{1i}, e_{1i})$. The verifier algorithm V then stores $(c_{0i}, c_{1i}, c_{2i})$.

Process (2): In the case where $Ch_i=1$, the verifier algorithm V retrieves $(r_{1i}, t_{0i}, e_{0i}, c_{2i})$ from $Rsp_i$. Subsequently, the verifier algorithm V calculates $c_{0i}=G(t_{0i}, r_{1i})+e_{0i})$. In addition, the verifier algorithm V calculates $c_{1i}=H(t_{0i}, e_{0i})$. The verifier algorithm V then stores $(c_{0i}, c_{1i}, c_{2i})$.

Process (3): In the case where $Ch_i=2$, the verifier algorithm V retrieves $(r_{1i}, t_{1i}, e_{1e}, c_{1i})$ from $Rsp_i$. Subsequently, the verifier algorithm V calculates $c_{0i}=H(R_{1i}, y-F(r_{1i})-G(t_{1i}, r_{1i})-e_{1i})$. In addition, the verifier algorithm V calculates $c_{2i}=H(t_{1i}, e_{1i})$. The verifier algorithm V then stores $(c_{0i}, c_{1i}, c_{2i})$.

After executing the above processes (1) to (3) for i=1 to N, the verifier algorithm V verifies whether or not the equality of $Cmt=H(c_{01}, c_{11}, c_{21}, \ldots, c_{0N}, c_{1N}, c_{2N})$ holds. The verifier algorithm V outputs the value 1 to indicate authentication success in the case where the verification succeeds, and outputs the value 0 to indicate authentication failure in the case where the verification fails.

The foregoing thus describes an example of efficient parallelized algorithm structures related to a 3-pass scheme.

3. Modification to Electronic Signature Scheme

Next a method of modifying the above public-key authentication scheme to an electronic signature scheme will be introduced.

Associating the prover in the model of the public-key authentication scheme with the signer in the electronic signature scheme easily demonstrates that the model of a public-key authentication scheme approximates the model of the electronic signature scheme in that only the prover is able to convince the verifier. On the basis of this thinking, a method of modifying the public-key authentication scheme discussed above to an electronic signature scheme will be described.

[3-1. Modification from 3-Pass Public-Key Authentication Scheme to Electronic Signature Scheme (FIG. 6)]

First, the modification from a 3-pass public-key authentication scheme to an electronic signature scheme will be described. As illustrated in FIG. 6, the algorithms modified from the 3-pass public-key authentication scheme to the electronic signature scheme are similar to parts of the parallelized versions of the algorithms from the 3-pass scheme described with FIG. 5. The algorithms for the public-key authentication scheme expressed by operation #1 to operation #4 in FIG. 5 are modified into a signature-generating algorithm Sig and a signature-verifying algorithm Ver as illustrated in FIG. 6.

Figure 6:
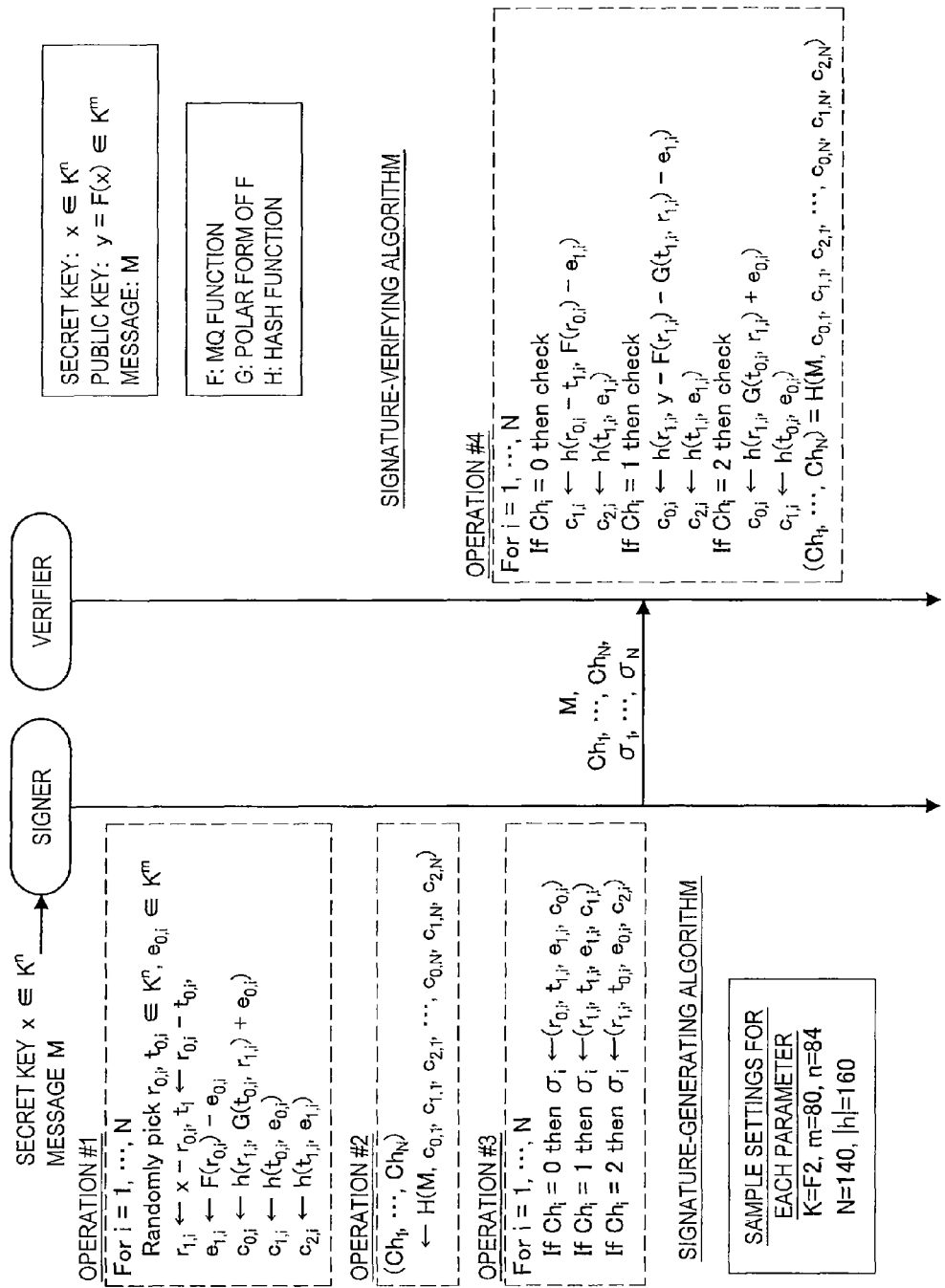
FIG. 6 is a schematic diagram illustrating a modification from a 3-pass public-key authentication scheme to an electronic signature scheme.

Operation #1:

As illustrated in FIG. 6, operation #1 is similar to operation #1 in FIG. 5.

Operation #2:

In the next operation #2, $Cmt \leftarrow H(c_{01}, c_{11}, c_{21}, \ldots, c_{0N}, c_{1N}, c_{2N})$ which was sent to the verifier algorithm V in FIG. 5 is not sent to the signature-verifying algorithm Ver, and instead, the signature-generating algorithm Sig calculates the hash value $H(M, c_{01}, c_{11}, c_{21}, \ldots, c_{0N}, c_{1N}, c_{2N})$ of a message M with an attached Cmt and signature as $(Ch_1, \ldots, Ch_N)$. In other words, the signature-generating algorithm Sig calculates $(Ch_1, \ldots, Ch_N) \leftarrow H(M, c_{01}, c_{11}, c_{21}, \ldots, c_{0N}, c_{1N}, c_{2N})$.

Operation #3:

As illustrated in FIG. 6, operation #3 is similar to operation #3 in FIG. 5. The signature-generating algorithm Sig generates a $\sigma_i$ to send to the signature-verifying algorithm Ver in response to each of $Ch_1, \ldots, Ch_N$. In the case where $Ch_i=0$, the signature-generating algorithm Sig generates a response $\sigma_i=(r_{0i}, t_{1i}, e_{1i}, c_{0i})$. In the case where $Ch_i=1$, the signature-generating algorithm Sig generates a response $\sigma_i=(r_{1i}, t_{0i}, e_{0i}, c_{2i})$. In the case where $Ch_i=2$, the signature-generating algorithm Sig generates a response $\sigma_i=(r_{1i}, t_{1i}, e_{1i}, c_{1i})$.

$Ch_1, \ldots, Ch_N$ and $\sigma_1, \ldots, \sigma_N$ generated in operation #3 are sent to the signature-verifying algorithm Ver. At the same time, the message M with attached signature is also sent to the signature-verifying algorithm Ver.

Operation #4:

As illustrated in FIG. 6, operation #4 is basically similar to operation #4 in FIG. 5. Upon receiving the responses $\sigma_1, \ldots, \sigma_N$, the signature-verifying algorithm Ver executes the following processes (1) to (3) for i=1 to N, using the received responses $\sigma_1, \ldots, \sigma_N$. Herein, the signature-verifying algorithm Ver executes the process (1) for the case where $Ch_i=0$, the process (2) in the case where $Ch_i=1$, and the process (3) in the case where $Ch_i=2$.

Process (1): In the case where $Ch_i=0$, the signature-verifying algorithm Ver retrieves $(r_{0i}, t_{1i}, e_{1i}, c_{0i})$ from $\sigma_i$. Subsequently, the signature-verifying algorithm Ver calculates $c_{1i}=H(r_{0i}-t_{1i}, F(r_{0i})-e_{1i})$. In addition, the signature-verifying algorithm Ver calculates $c_{2i}=H(t_{1i}, e_{1i})$. The signature-verifying algorithm Ver then stores $(c_{0i}, c_{1i}, c_{2i})$.

Process (2): In the case where $Ch_i=1$, the signature-verifying algorithm Ver retrieves $(r_{1i}, t_{0i}, e_{0i}, c_{2i})$ from $\sigma_i$. Subsequently, the signature-verifying algorithm Ver calculates $c_{0i}=H(r_{1i}, G(t_{0i}, r_{1i})+e_{1i})$. In addition, the signature-verifying algorithm Ver calculates $c_{1i}=H(t_{0i}, e_{0i})$. The signature-verifying algorithm Ver then stores $(c_{0i}, c_{1i}, c_{2i})$.

Process (3): In the case where $Ch_i=2$, the signature-verifying algorithm Ver retrieves $(r_{1i}, t_{1i}, e_{1i}, c_{1i})$ from $\sigma_i$. Subsequently, the signature-verifying algorithm Ver calculates $c_{0i}=H(r_{1i}, y-F(r_{1i})-G(t_{1i}, r_{1i})-e_{1i})$. In addition, the signature-verifying algorithm Ver calculates $c_{2i}=H(t_{1i}, e_{1i})$. The signature-verifying algorithm Ver then stores $(c_{0i}, c_{1i}, c_{2i})$.

After executing the above processes (1) to (3) for i=1 to N, the signature-verifying algorithm Ver verifies whether or not the equality of $(Ch_1, \ldots, Ch_N)=H(M, c_{01}, c_{11}, c_{21}, \ldots, c_{0N}, c_{1N}, c_{2N})$ holds. The signature-verifying algorithm Ver outputs the value 1 to indicate authentication success in the case where the verification succeeds, and outputs the value 0 to indicate authentication failure in the case where the verification fails.

As described above, associating the prover in the model of a public-key authentication scheme with the signer in an electronic signature scheme enables the modification of the algorithms for the public-key authentication scheme into algorithms for the electronic signature scheme.

4. Specific Embodiments

[4-1. Summary of System According to an Embodiment of Present Disclosure]

In the case of adding an electronic signature described above to email, the electronic signature is technology for verifying whether or not a signature is valid for a given public key, whereas the mail address is not verified. For this reason, verifying the validity of an electronic signature attached to email involves a separate guaranteeing of the associative relationship between an email address and a public key as described earlier by some method. For example, a transmitted public key and email address may be associated by a method such as storing a list indicating associative relationships between email addresses and public keys somewhere inside a PC. However, such a method involves separately providing a list indicating associative relationships between email addresses and public keys, and the processing becomes complicated.

The present embodiment eliminates the associating of an email address and a public key by integrating the email address and public key into one, thereby easily realizing verification that the mail address and the public key are associated.

Figures 7, 8, 9:
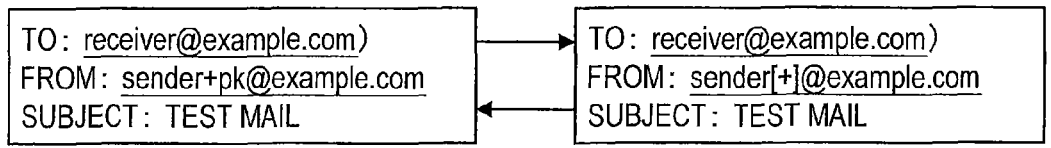
FIG. 7 is a schematic diagram illustrating a mail address with an integrated email address and public key according to the present embodiment.
FIG. 8 is a schematic diagram illustrating an example of a display format for a mail address.
FIG. 9 is a schematic diagram illustrating an example of displaying a handwriting-like signature as a specific example of a mark to display.

For this reason, in the present embodiment, a mail address having an integrated email address and public key is utilized, and signature verification is conducted by utilizing the public key in the sender address. FIG. 7 is a schematic diagram illustrating a mail address with an integrated email address and public key according to the present embodiment. As illustrated in FIG. 7, the sender transmits email utilizing his or her own mail address (sender@example.com). In the case of adding a public key pk to the mail address, the public key pk is added inside the mail address (sender@example.com) and transmitted as (sender+pk@example.com). The public key pk is encoded using Base64 (a technique of expressing 6-bit information with single characters), for example, and integrated into the mail address. In this way, in the present embodiment, the public key pk is embedded into the mail address (sender@example.com). Although the public key pk is embedded into the mail address (sender@example.com), the transmitting side transmits an email while ignoring the public key pk part.

The "+" sign indicates that a public key pk is embedded after the "+" sign. The public key pk is the part embedded between the "+" and "@" signs. This convention is agreed upon between the sender side and the receiver side in advance.

At the receiver side, when a mail message from sender+pk@example.com is received, the public key pk is extracted, and the result of verifying the digital signature attached to the mail message with the public key pk (accepted or rejected) is reported to a user.

With the MQ scheme discussed earlier, it is possible to minimize the length (number of bits) of the public key pk, enabling construction of a public key pk that is 100 bits or less, and more particularly, preferably 80 bits or less. Consequently, using a public key pk according to the MQ scheme in particular makes it possible to easily embed the public key pk into a mail address. On the other hand, in the case of using a public-key authentication protocol other than the MQ scheme, the public key becomes longer than 100 bits, making the length of the public key in the mail address very long. For this reason, the mail address becomes overly long, leading to complicated processes and difficulties with respect to handling and recognizing mail addresses. Consequently, using a public key pk according to the MQ scheme in particular makes it possible to minimize the length of the mail address, even in the case of integrating the mail address and the public key. Note that among public-key authentication schemes, the MQ authentication scheme is the only scheme able to make the length of the public key 80 bits or less.

In this way, since the mail address and the public key pk are integrated in the present embodiment, it is possible for the receiver side of an email transmission to derive a public key pk from the sender address in the received email, without separately saving associative relationships between mail addresses and public keys pk. Consequently, it becomes possible to easily associate the sender of an email with a public key pk, without separately verifying that the sender of the email and the public key pk are associated.

Note that although a public key pk is embedded into a mail address at the time of transmission in the above example, a mail address with a public key pk embedded into the original mail address may be acquired, and the mail address with the embedded public key pk (sender+pk@example.com) may be used continually.

[4-2. Example of Mail Address Display Format]

FIG. 8 is a schematic diagram illustrating an example of a display format for a mail address. FIG. 8 assumes that "receiver@example.com" is the recipient of an email transmitted by a sender, and that "sender@example.com" is the sender's email address. Similarly to the above, the sender adds a public key pk inside his or her own mail address (sender@example.com), and transmits a mail message with the sender set to "sender+pk@example.com". In this way, a device or server able to transmit a mail message while substituting the sender address with "sender+pk@example.com" is used on the sender side.

On the receiving side, an email specifying the sender as "sender+pk@example.com" is received. At this point, the public key may also be hidden from view. In the case of hiding a public key pk, the device on the receiver side (a mail receiving device 400) displays a mail message with the sender displayed as "sender[+]@example.com" with "[+]" substituted for "pk", for example. A user may cause the public key pk to be displayed by clicking on "[+]".

Since it is possible to verify whether or not two or more mail messages arriving from the same address "sender+pk@example.com" are mail messages transmitted from the same person, it is possible to reliably verify whether or not the address has been forged. Note that since a public key infrastructure (PKI) is not utilized, the identity of a sender corresponding to a public key pk is not verified. In other words, the present embodiment links a sender's mail address with a public key pk, but does not link the sender him- or herself with the public key pk.

The receiver side reports a verification result for an electronic signature a to the sender side. The reporting method may involve changing the color of part of the display or displaying a mark, for example. For example, a report may be issued by changing a display color to green in the case where an electronic signature a is genuine and verification is successful, and changing the display color to red in the case where verification fails. Also, an "O" mark may be displayed in the case where verification is successful, and an "X" mark may be displayed in the case where verification fails.

As another specific example of a mark to display, a handwriting-like signature as illustrated in FIG. 9 may also be displayed. In this case, it is additionally possible to alert a user to differences in the public key by changing the shape of the handwriting-like signature according to the public key. The font may also be modified depending on the public key.

In the case where emails are received from multiple different senders in which only the public key pk differs inside the sender address, the emails may be treated as being from the same sender or not depending on policy. However, since there is a possibility that the sender address may be forged in such cases, it is preferable to report to a user that only the public key pk differs while the rest of the mail address is the same, and prompt the user for careful attention.

[4-3. Process by System According to Present Embodiment]

Figure 10:
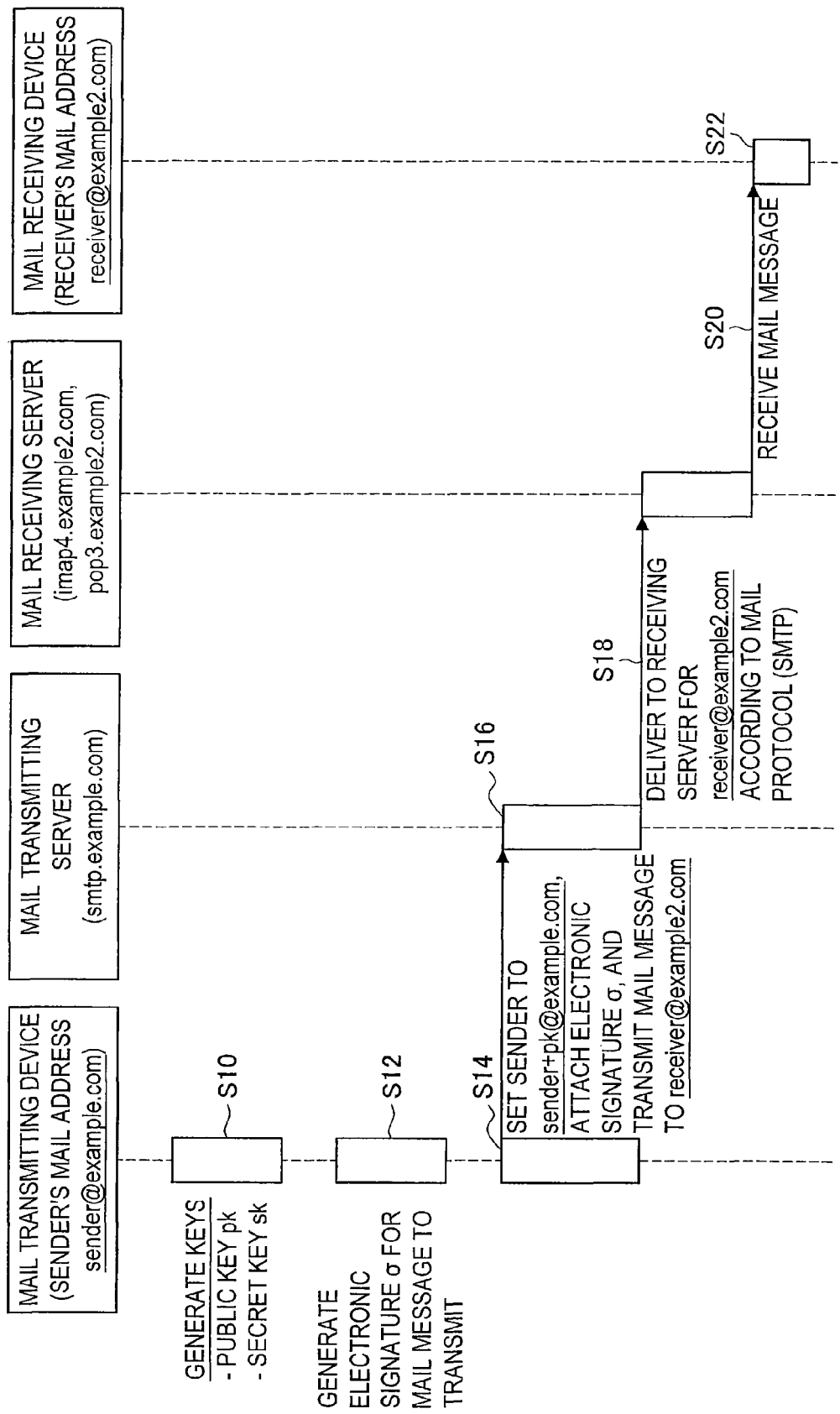
FIG. 10 is a sequence diagram illustrating a process according to the present embodiment.

Next, a process by a system according to the present embodiment will be described. FIG. 10 is a sequence diagram illustrating a process according to the present embodiment. First, in step S10, a mail transmitting device 100 generates a public key pk and a secret key sk. In the next step S12, the mail transmitting device 100 generates an electronic signature a for an email to transmit.

In the next step S14, the mail transmitting device 100 adds a public key pk to the original sender address (sender@example.com), sets the sender address to "sender+pk@example.com", attaches the electronic signature a, and transmits an email to a recipient (receiver example2.com).

In the next step S16, a mail transmitting server 200 receives the email transmitted by the mail transmitting device 100 in step S14. The mail transmitting server ignores the "pk" between "+" and "@" in the sender address (sender+pk@example.com), and processes the mail message as being from the "sender@example.com" account. In so doing, it is possible to avoid a situation where an email is not correctly transmitted, without having the mail transmitting server 200 determine that the email transmitted from the mail transmitting device 100 was transmitted from an unknown user with the account "sender+pk@example.com".

In the next step S18, the mail transmitting server 200 transmits an email to a mail receiving server 300. The email transmitted in step S18 is received by the mail receiving server 300 at "receiver@example2.com" according to a mail protocol (SMTP).

In the next step S20, the mail receiving server 300 transmits an email to a mail receiving device 400, and the mail receiving device 400 receives the email. In step S22, the mail receiving device 400 that has received the email refers to the sender address (sender+pk@example.com), treats the pk between "+" and "@" as a public key, and extracts the public key. The mail receiving device 400 then verifies whether or not the attached electronic signature 6 is a correct signature for the email, according to the electronic signature authentication described using FIG. 6. At this point, the body of the email may be treated as corresponding to the message M. Also, the mail transmitting device 100 corresponds to the signer, while the mail receiving device 400 corresponds to the verifier. The mail receiving device 400 then reports a verification result indicating whether to accept or reject the email to the mail transmitting device 100.

[4-4. Sender Confirmation Based on Public Key]

According to the technique of integrating an email address and a public key pk as above, even if emails are transmitted from different addresses, it is still possible to confirm that the sender is the same if the same public key pk is included in the sender addresses.

For example, even if mail messages are transmitted from different addresses, it is still possible to confirm that the sender is the same if the same public key is included in the sender addresses. For example, in the case where emails are transmitted from the two addresses "kuma@gmail.com" and "panda@hotmail.com", it is difficult to determine whether or not the two senders are the same.

However, according to the present embodiment, a public key and an email address are integrated, and thus the senders of emails transmitted from the above two address become the following:

kuma+pkA@gmail.com
panda+pkA@hotmail.com

Since only the user possessing a secret key skA corresponding to the public key pkA is able to attach an electronic signature with the public key pkA, it is possible to confirm that the two transmitted mail messages were transmitted from the same person.

[4-5. Adding Public Key by Transmitting Server]

In the example described above, the mail transmitting device 100 (the sender him- or herself) transmits a mail message with a public key pk added to the sender address (sender@example.com). However, the mail transmitting server 200 may also add the public key pk to the sender address (sender@example.com). In this case, rather than the sender him- or herself adding the public key pk at the time of transmission, the sender registers his or her own public key pk in the mail transmitting server 200 in advance, and when the sender transmits a mail message with an electronic signature attached, the transmitting server automatically adds the public key pk to the sender address and delivers the mail message. Thus, it is possible to simply processing without having the sender add his or her own public key pk to the sender address.

Figure 11:
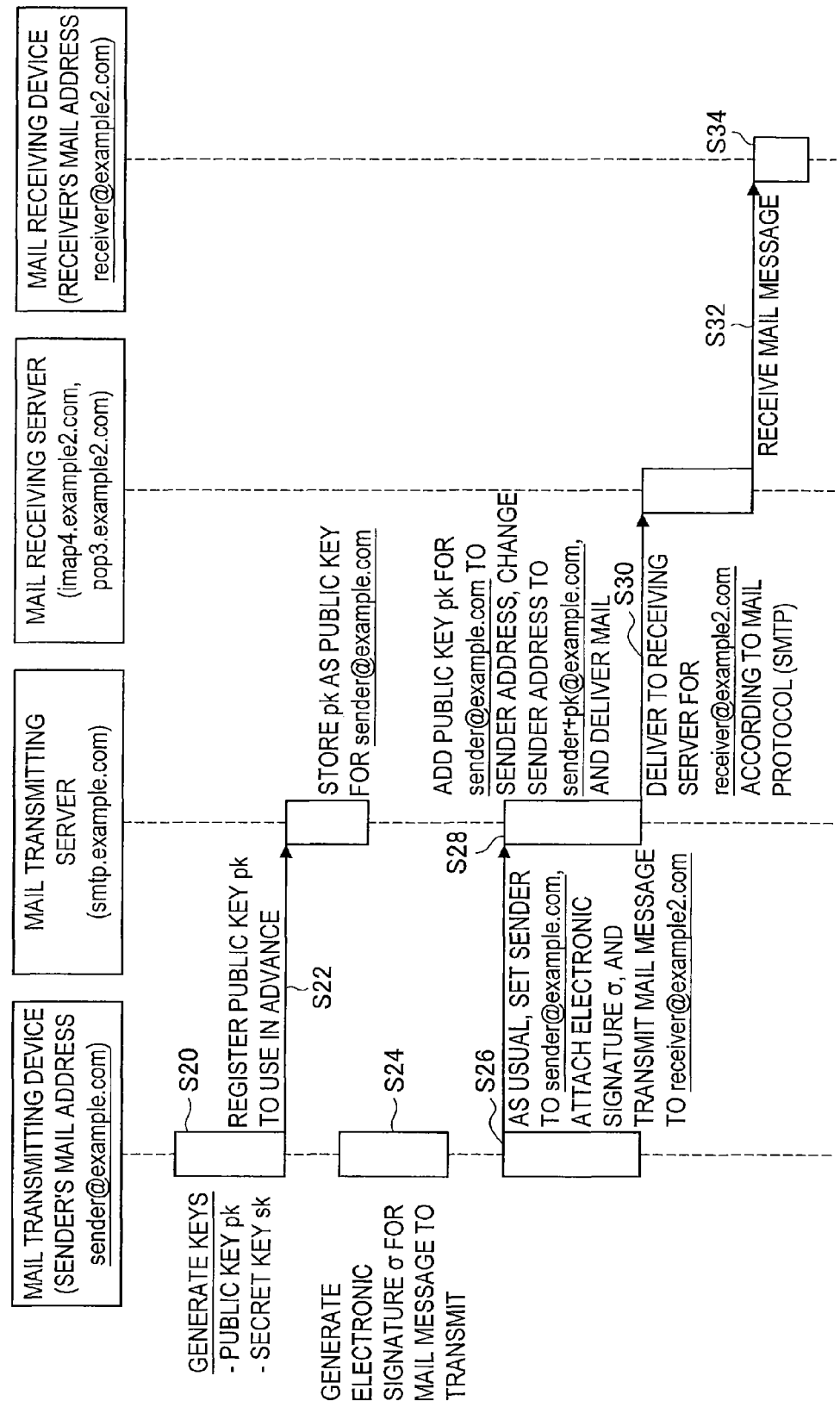
FIG. 11 is a sequence diagram illustrating a process for the case where a mail transmitting server 200 adds a public key pk.

FIG. 11 is a sequence diagram illustrating a process for the case where a mail transmitting server 200 adds a public key pk. First, in step S20, a mail transmitting device 100 generates a public key pk and a secret key sk. In the next step S22, the mail transmitting device 100 transmits the public key pk to the mail transmitting server 200. In step S23, the mail transmitting server 200 registers the public key pk. In this way, the mail transmitting device 100 registers a public key pk to utilize in the mail transmitting server 200 in advance. The mail transmitting server 200 associates and stores the sender address (sender@example.com) and the public key pk.

In the next step S24, the mail transmitting device 100 generates an electronic signature G for an email to transmit.

In the next step S26, the mail transmitting device 100 sets the sender to "sender@example.com", attaches the electronic signature a, and transmits an email to a recipient (receiver example2.com).

In the next step S28, a mail transmitting server 200 receives the email transmitted by the mail transmitting device 100 in step S26. Then, the mail transmitting server 200 adds the public key pk corresponding to the sender address (sender@example.com) to the sender address, changing the address to "sender+pk@example.com".

In the next step S30, the mail transmitting server 200 transmits an email to a mail receiving server 300. The email transmitted in step S30 is received by the mail receiving server 300 at "receiver@example2.com" according to a mail protocol (SMTP).

In the next step S32, the mail receiving server 300 that has received the email transmits the email to the mail receiving device 400. The mail receiving device 400 that has received the email refers to the sender address (sender+pk@example.com), treats the pk between "+" and "@" as the public key, and verifies whether or not the attached electronic signature a is a correct signature for the email (step S34). The mail receiving device 400 then reports a verification result indicating whether to accept or reject the email to the mail transmitting device 100.

[4-6. Exemplary Configuration of System According to Present Embodiment]

Figure 12:
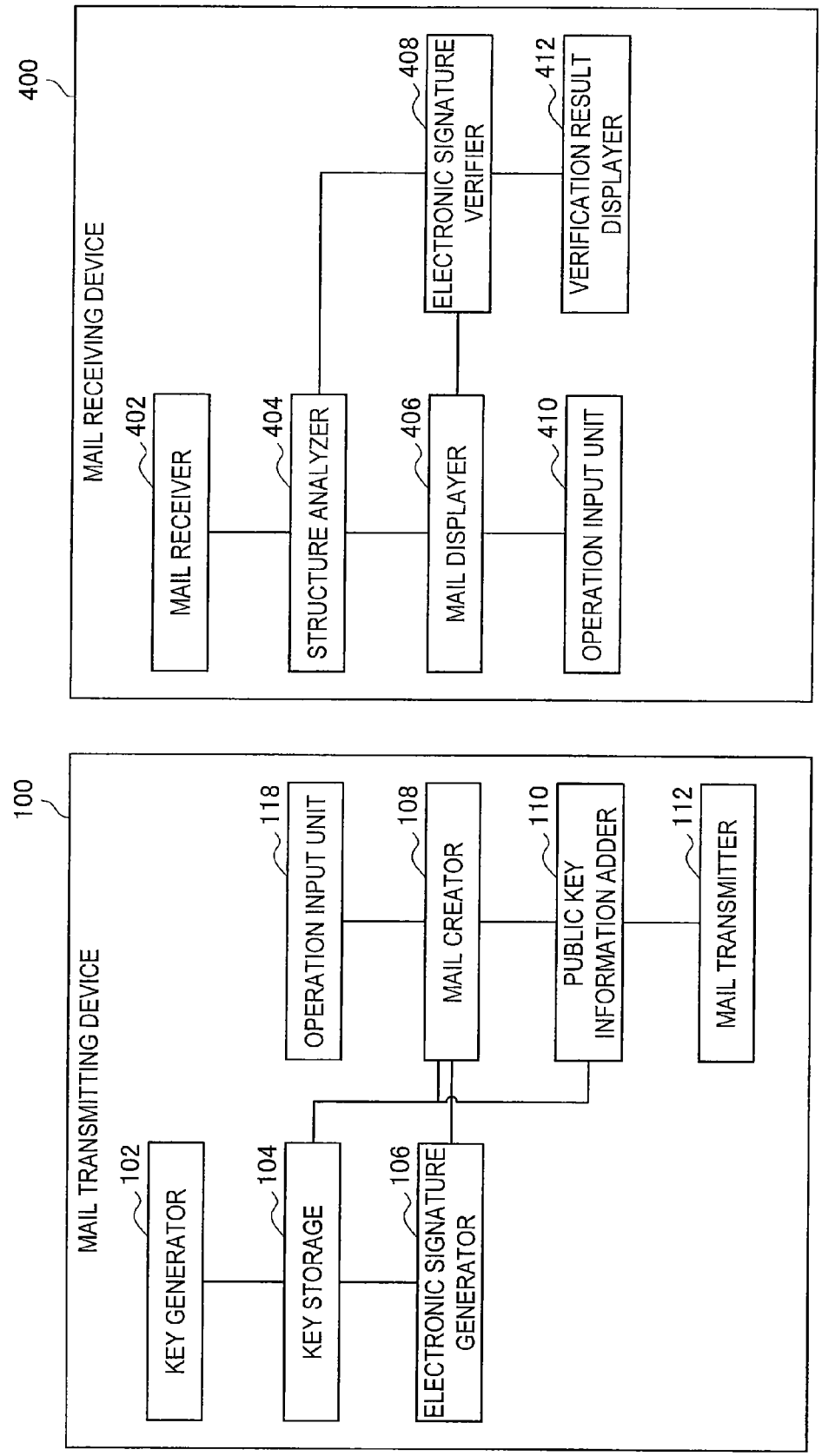
FIG. 12 is a schematic diagram illustrating a system configuration according to the present embodiment.

FIG. 12 is a schematic diagram illustrating a configuration of a mail transmitting device 100 and a mail receiving device 400 in a system according to the present embodiment. The mail transmitting device 100 includes a key generator 102, key storage 104, an electronic signature generator 106, a mail creator 108, a public key information adder 110, a mail transmitter 112, and an operation input unit 118. The key generator 102 generates a public key pk and secret key sk pair. Specifically, the key generator 102 conducts a process that includes operation #1 in FIG. 6. The key storage 104 is memory that stores a public key pk and a secret key sk generated by the key generator 102. Note that a public key pk and secret key sk pair may also be generated by an external device and be stored in the key storage 104. The electronic signature generator 106 conducts operations #2 and #3 in FIG. 6, and generates an electronic signature a. The mail creator 108 creates an email to transmit to the mail receiving device 400 on the basis of factors such as information input into the operation input unit 118. The mail creator 108 attaches the electronic signature σ to the created email. The public key information adder 110 adds the public key pk to the sender address of the email. At this point, the public key information adder 110 may encode the public key pk according to a technique such as Base64 before adding. The mail transmitter 112 transmits the email with the attached electronic signature 6 and the public key pk added to the sender address. A verification result receiver 114 receives a verification result transmitted from the mail receiving device 400. A verification result displayer 116 presents a display according to the received verification result. The operation input unit 118 includes structural elements such as a touch sensor and a keyboard that a user operates in order to input information.

Meanwhile, the mail receiving device 400 includes a mail receiver 402, a structure analyzer (public key extractor) 404, a mail displayer 406, an electronic signature verifier 408, a verification result displayer 412, and an operation input unit 410. The mail receiver 402 receives an email transmitted by the mail transmitting device 100 via the mail transmitting server 200 and the mail receiving server 300. The structure analyzer 404 analyzes the structure of the sender address in the email, and extracts a public key pk from the sender address. Specifically, the structure analyzer 404 extracts the text string between "+" and "@" in the sender address as the public key pk. The structure analyzer 404 may also decode a public key pk that has been encoded according to a technique such as Base64. The public key pk is passed to the electronic signature verifier 408. The mail displayer 406 displays the content of the email. The electronic signature verifier 408 conducts operation #4 in FIG. 6, and verifies the electronic signature σ attached to the email. The verification result is displayed by the verification result displayer 412. The operation input unit 410 includes structural elements such as a touch sensor and a keyboard that a user operates in order to input information.

Figure 13:
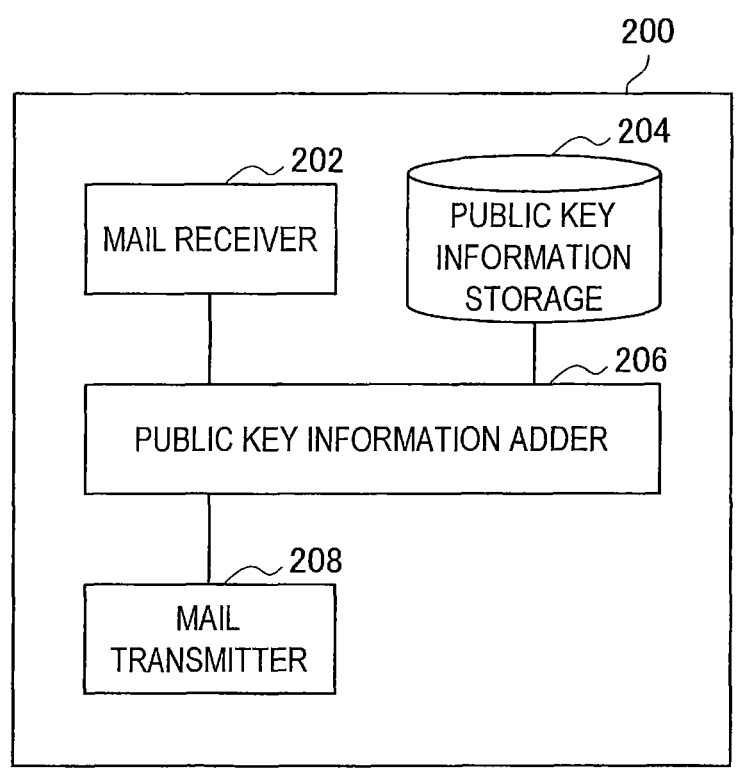
FIG. 13 is a schematic diagram illustrating a configuration of a mail transmitting server for an example in which the mail transmitting server automatically adds a public key pk to a sender address.

FIG. 13 is a schematic diagram illustrating a configuration of the mail transmitting server 200 for an example in which the mail transmitting server 200 automatically adds a public key pk to a sender address as discussed earlier. As illustrated in FIG. 13, the mail transmitting server 200 includes a mail receiver 202, public key information storage 204, a public key information adder 206, and a mail transmitter 208. The mail receiver 202 receives an email created by the mail creator 108 of the mail transmitting device 100. Although an electronic signature σ is attached to this email, a public key pk has not been added to the sender address. The public key information storage 204 is memory that stores public keys pk, and stores the sender address of the email and the public key pk in association with each other. From the public key information storage 204, the public key information adder 206 extracts the public key pk corresponding to the sender address of the email received by the mail receiver 202, and adds the extracted public key pk to the sender address of the email. The message transmitter 112 transmits, to the mail receiving server 300, the email with the attached electronic signature σ and the public key pk appended to the sender address.

Note that the respective structural elements illustrated in FIGS. 12 and 13 may be realized by hardware (circuits), or by a program (software) causing a processor such as a CPU to function as the structural elements. In this case, the program may be stored on a recording medium such as memory provided in the respective devices, or external memory externally connected to the respective devices.

[4-7. Application to Mail Forwarding and Mailing Lists]

Next, application to mail forwarding and the sender address of a mailing list will be described. When forwarding mail, or when using a mailing list, mail is sometimes delivered with the sender modified by the mail server. In such cases, it is conceivable that the true sender may become unknown due to sender modification.

In such cases, the technology according to the present disclosure is applied by leaving the public key added to the address as-is, and substituting only the sender address. For example, assume that "OriginalAddress+pkA@example.com" is the true sender address of an email posted to a mailing list, while "MailingListAddress+pkA@example2.com" is the sender address displayed when the email is delivered to the mailing list. In this way, the public key pkA part is not modified, even in cases where the sender address is modified. Thus, it is still possible to confirm on the email receiving side that a mail message was transmitted by the same person even if the sender address is modified, as long as just the public key part matches.

[4-8. Methods of Specifying Public Key Part]

In the foregoing embodiments, a public key part is specified as being the part between "+" and "@" in a sender mail address. However, the specification method has no particular restrictions, and is not limited to the above example. For example, the part from the beginning of an address to "+" may also be specified as a public key pkA as follows:
pkA+sender@example.com Also, the part from "+" to the end of an address may also be specified as a public key pkA as follows:
sender@example.com+pkA Furthermore, although the above "+" signifies an escape sequence, obviously it is possible to use a sign other than the plus sign "+". The specification of the public key part may involve the use of any method insofar as the specification enables the determination of which part of a mail address is a public key pk.

5. Exemplary Hardware Configuration (FIG. 14)

It is possible to execute the respective algorithms above by using the hardware configuration of an information processing apparatus illustrated in FIG. 14, for example. In other words, the processing by each algorithm is realized by using a computer program to control the hardware illustrated in FIG. 14. Note that the format of this hardware is arbitrary, and encompasses personal computers, mobile phones, portable information terminals such as PHS devices and PDAs, game consoles, contact or contactless IC chips, contact or contactless IC cards, and various information appliances, for example. Note that PHS above is an abbreviation of Personal Handy-phone System, while PDA above is an abbreviation of personal digital assistant.

As illustrated in FIG. 14, the hardware primarily includes a CPU 902, ROM 904, RAM 906, a host bus 908, and a bridge 910. The hardware additionally includes an external bus 912, an interface 914, an input unit 916, an output unit 918, a storage unit 920, a drive 922, a connection port 924, and a communication unit 926. Note that CPU above is an abbreviation of central processing unit, while ROM above is an abbreviation of read-only memory, and RAM above is an abbreviation of random access memory.

The CPU 902 functions as a computational processing device or control device, for example, and controls all or part of the operation of each structural element on the basis of various programs recorded in the ROM 904, the RAM 906, the storage unit 920, or a removable recording medium 928. The ROM 904 is a mechanism of storing information such as programs loaded by the CPU 902 and data used in computations. The RAM 906 transiently or persistently stores information such as programs loaded by the CPU 902, and various parameters that change as appropriate when executing such programs, for example.

These structural elements are interconnected via a host bus 908 capable of high-speed data transmission, for example. Meanwhile, the host bus 908 is connected via the bridge 910 to an external bus 912 having comparatively low-speed data transmission, for example. Devices such as a mouse, keyboard, touch panel, buttons, switches, and levers may be used as the input unit 916, for example. Additionally, a remote control (hereinafter, remote) capable of using infrared or other electromagnetic waves to transmit control signals may be used as the input unit 916 in some cases.

The output unit 918 includes a device capable of visually or aurally reporting acquired information to a user, and may be a display device such as a CRT, LCD, PDP, or ELD, an audio output device such as one or more speakers or headphones, a printer, a mobile phone, or a fax machine, for example. Note that CRT above is an abbreviation of cathode ray tube, while LCD above is an abbreviation of liquid crystal display, PDP above is an abbreviation of plasma display panel, and ELD above is an abbreviation of electroluminescent display.

The storage unit 920 is a device that stores various data. Devices such as a hard disk drive or other magnetic storage device, a semiconductor storage device, an optical storage device, or a magneto-optical storage device may be used as the storage unit 920, for example. Note that HDD above is an abbreviation of hard disk drive.

The drive 922 is a device that reads out information recorded onto a removable recording medium 928 such as a magnetic disk, an optical disc, a magneto-optical disc, or semiconductor memory, for example, and may also write information to the removable recording medium 928. The removable recording medium 928 is an instance of DVD media, Blu-ray media, HD DVD media, or various semiconductor storage media, for example. Obviously, the removable recording medium 928 may also be an IC card mounted with a contactless IC chip, or other electronic device, for example. Note that IC above is an abbreviation of integrated circuit.

The connection port 924 is a port that connects to an externally-connected device 930, such as a USB port, an IEEE 1394 port, a SCSI port, an RS-232C port, or an optical audio terminal, for example. The externally-connected device 930 may be a printer, a portable music player, a digital camera, a digital video camera, or an IC recorder, for example. Note that USB above is an abbreviation of Universal Serial Bus, while SCSI above is an abbreviation of Small Computer System Interface.

The communication unit 926 is a communication device that connects to a network 932, and may be a communication card for wired or wireless LAN, Bluetooth (registered trademark), or WUSB, an optical communication router, an ADSL router, or a device for contact or contactless communication, for example. Also, the network 932 connected to the communication unit 926 is a network connected in a wired or wireless manner, and may be the Internet, a home LAN, infrared communication, visible light communication, broadcasting, or satellite communication, for example. Note that LAN above is an abbreviation of local area network, while WUSB above is an abbreviation of Wireless USB, and ADSL above is an abbreviation of asymmetric digital subscriber line.

The technical matter discussed in the foregoing may be applied to various information processing apparatus, such as PCs, mobile phones, game consoles, information terminals, information appliances, and car navigation systems, for example. Note that the functions of the information processing apparatus discussed below are realizable using a single information processing apparatus, and also realizable using multiple information processing apparatus. Also, the data storing mechanism and computing mechanism used when the information processing apparatus discussed below executes a process may be provided in that information processing apparatus, and may also be provided in equipment connected via a network.

According to the present embodiment as described above, integrating the sender mail address of an email with a public key pk avoids a process for associating the mail address and the public key pk on the receiver side. Consequently, it becomes possible to easily verify an electronic signature a using the public key pk.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A transmitting device including:
a public key information adder that adds information on a public key corresponding to an electronic signature to a sender address in an email with the electronic signature attached; and
a transmitter that transmits the email.

(2) The transmitting device according to (1), further including:
a key generator that generates the public key and a secret key as a pair;
a signature generator that generates the electronic signature; and
an email creator that creates the email with the electronic signature attached.

(3) The transmitting device according to (1), further including:
a receiver that receives the email with the electronic signature attached from another device; and
a public key information storage that stores the information on the public key corresponding to the electronic signature,
wherein the public key information adder adds the information on the public key extracted from the public key information storage to a sender address in the email received from the other device.

(4) The transmitting device according to any one of (1) to (3), further including:
a verification result receiver that receives, from a receiving device that received the email, a result of verifying the electronic signature on the basis of the information on the public key.

(5) The transmitting device according to any one of (1) to (5), wherein
the electronic signature is an electronic signature according to an MQ protocol.

(6) A receiving device including:
a receiver that receives an email with an electronic signature attached;
a public key information extractor that extracts information on a public key, corresponding to the electronic signature, that is added to a sender address in the email; and
a verifier that verifies the electronic signature on the basis of the information on the public key.

(7) The receiving device according to (6), further including:
a transmitter that transmits a verification result by the verifier.

(8) The receiving device according to (7), wherein
the transmitter causes a transmission recipient device to display the verification result in a manner that a display of text or a mark, or a display color, is modified according to the verification result.

(9) The receiving device according to any one of (6) to (8), wherein
the email is an email forwarded from a mailing list, and information identical to the information on the public key is included in a mail address of a poster who has posted to the mailing list.

(10) The receiving device according to any one of (6) to (9), wherein
the electronic signature is an electronic signature according to an MQ protocol.

(11) A transmitting method including:
adding information on a public key corresponding to an electronic signature to a sender address in an email with the electronic signature attached; and
transmitting the email.

(12) A program causing a computer to function as:
a public key information adder that adds information on a public key corresponding to an electronic signature to a sender address in an email with the electronic signature attached; and
a transmitter that transmits the email.

(13) A receiving method including:
receiving an email with an electronic signature attached;
extracting information on a public key, corresponding to the electronic signature, that is added to a sender address in the email; and
verifying the electronic signature on the basis of the information on the public key.

(14) A program causing a computer to function as:
a receiver that receives an email with an electronic signature attached;
a public key information extractor that extracts information on a public key, corresponding to the electronic signature, that is added to a sender address in the email; and
a verifier that verifies the electronic signature on the basis of the information on the public key.

The present disclosure contains subject matter related to that disclosed in Japanese Priority Patent Application JP 2012-211130 filed in the Japan Patent Office on Sep. 25, 2012, the entire content of which is hereby incorporated by reference.

What is claimed is:

1. A transmitting device comprising:
circuitry that
adds a public key to a sender address in an email that includes an electronic signature attached, the public key corresponding to the electronic signature attached to the email, wherein a MQ protocol is utilized to set number of bits of the public key in the sender address equal to or less than a predetermined value; and
transmits the email.

2. The transmitting device according to claim 1, wherein the circuitry further
generates the public key and a secret key that is paired with the public key;
generates the electronic signature; and
creates the email that includes the electronic signature attached.

3. The transmitting device according to claim 1, wherein the circuitry further
receives the email that includes the electronic signature attached from another device;

stores information on the public key corresponding to the electronic signature; and adds the information on the public key, from the public key information storage, to the sender address in the email received from the other device.

4. The transmitting device according to claim 1, wherein the circuitry further receives, from a receiving device that received the email, a result of verifying the electronic signature based on the public key.

5. The transmitting device according to claim 1, wherein the electronic signature is an electronic signature according to a multivariate protocol.

6. A receiving device comprising:

circuitry that receives an email that includes an electronic signature attached;

extracts a public key from a sender address in the email, the public key corresponding to the electronic signature attached to the email, wherein, in the email displayed at the receiving device, the public key is hidden from view with a symbol substituted for the public key; and verifies the electronic signature based on the public key.

7. The receiving device according to claim 6, wherein the circuitry further transmits a verification result to a transmission recipient device.

8. The receiving device according to claim 7, wherein the circuitry further causes the transmission recipient device to display the verification result in a manner that a display of text or a mark, or a display color, is modified according to the verification result.

9. The receiving device according to claim 6, wherein the email is an email forwarded from a mailing list, and information identical to information on the public key is included in a mail address of a poster that has posted to the mailing list.

10. The receiving device according to claim 6, wherein the electronic signature is an electronic signature according to a multivariate protocol.

11. The receiving device according to claim 6, wherein the circuitry extracts the public key from local part of the sender address in the email.

12. The receiving device according to claim 11, wherein the circuitry extracts the public key from end of the local part of the sender address in the email.

13. The receiving device according to claim 6, wherein the circuitry extracts the public key appended between a symbol and domain part of the sender address in the email, wherein the symbol is appended to end of local part of the sender address in the email.

14. A transmitting method comprising:

retaining, by circuitry, a public key on a sender address in an email that includes an electronic signature attached, the public key corresponding to the electronic signature attached to the email, wherein the public key remains same and the sender address in the email is modified in an event of the email forwarding; and transmitting, by the circuitry, the email.

15. A non-transitory computer readable medium that stores a set of computer executable instructions that, when executed by a computer including circuitry, causes the circuitry to:

add a public key to a sender address in an email that includes an electronic signature attached, the public key corresponding to the electronic signature attached to the email, wherein a MQ protocol is utilized to set number of bits of the public key in the sender address equal to or less than a predetermined value; and transmit the email.

16. A receiving method comprising:

receiving, by circuitry, an email that includes an electronic signature attached;

extracting, by the circuitry, a public key from a sender address in the email, the public key corresponding to the electronic signature attached to the email, wherein, in the email displayed at the receiving device, the public key is hidden from view with a symbol substituted for the public key; and verifying, by the circuitry, the electronic signature based on the public key.

17. A non-transitory computer readable medium that stores a set of computer-executable instructions that, when executed by a computer including circuitry, causes the circuitry to:

receive an email that includes an electronic signature attached;

extract a public key from a sender address in the email, the public key corresponding to the electronic signature attached to the email;

verify the electronic signature based on the public key; and transmit a verification result in a manner that a display of text is modified changing at least one of: shape, font or color of the text according to the verification result.

* * * * *